United States Patent Office 3,325,875
Patented June 20, 1967

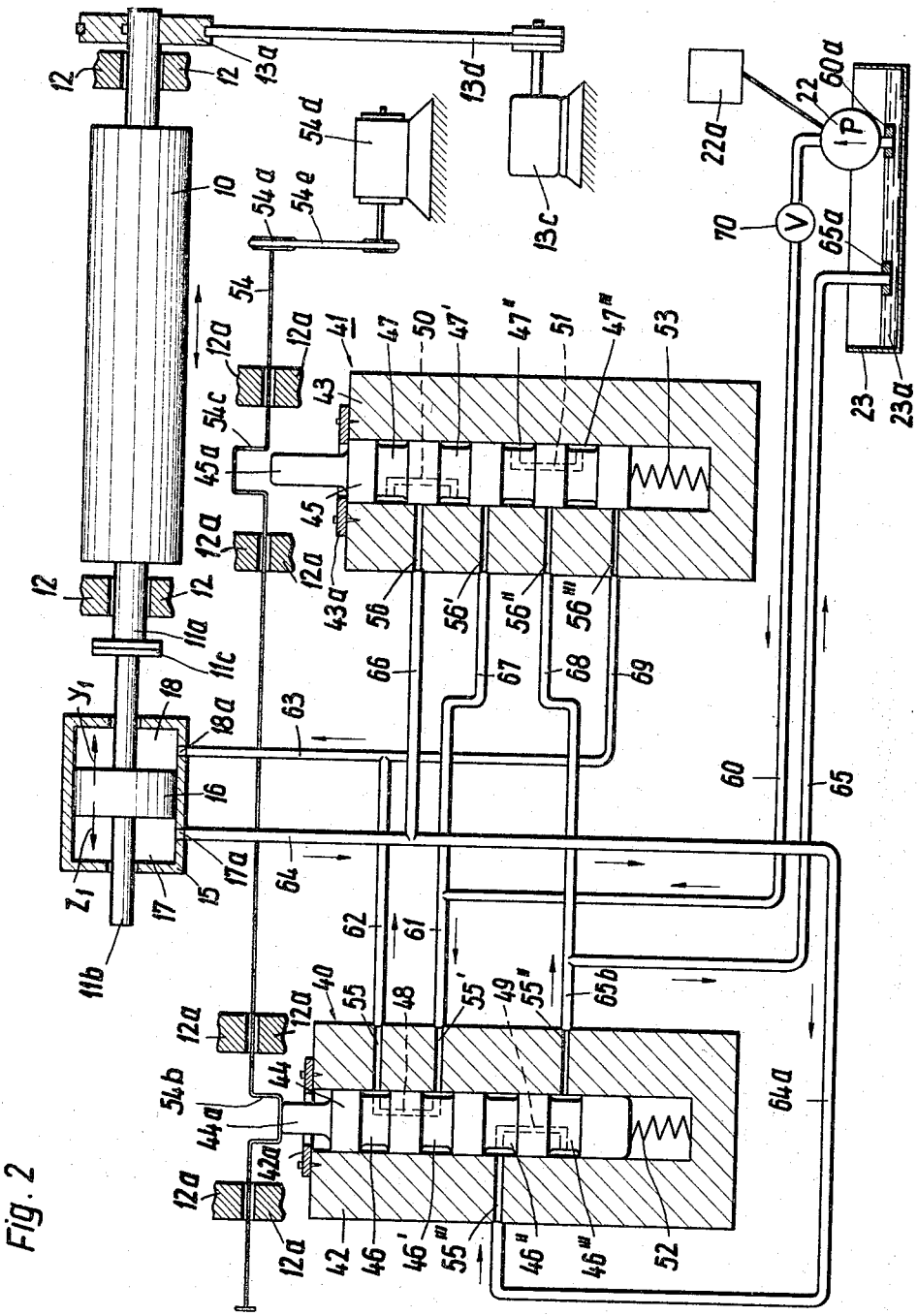

3,325,875
APPARATUS FOR MANUFACTURING FELT
Krafft Göbel, deceased, late of Alsfeld, Hesse, Germany, by Erna Göbel, geboren Friede, Am Hofacker 7, Alsfeld, Hesse, Germany; Else Schonfeld, geboren Göbel, Freiherr-von-Stein-Str. 153-A, Mulheim (Ruhr), Germany; Eva Göbel, Altenburger Str. 49, Alsfeld, Hesse, Germany; Renate Geiger, geboren Göbel, Gartenstr. 14, Holtensen, Germany; Erhard Göbel, Am Hofacker 7, Alsfeld, Hesse, Germany, and Volker Göbel, Neustadter Str. 10, Coburg, Germany, heirs, and Erhard Göbel, Am Hofacker 7, Alsfeld, Hesse, Germany
Filed July 1, 1965, Ser. No. 469,371
13 Claims. (Cl. 28—5)

This invention relates generally to apparatus for manufacturing felt and more particularly is concerned with a novel arrangement to drive and control such apparatus.

For manufacturing felt-like products, machines of the plate type or the roller type are commonly used to engage the fibers with each other under the right conditions of temperature, humidity, pressure, mechanical movement so to mat them together and to achieve a mutual chain-like connection therebetween.

Machines of the plates type comprise a normally stationary lower plate, an upper plate adapted to perform circular or elliptical horizontal movement with respect to the lower plate the fibers being passed between the upper and the lower plate and being subjected to the resulting relative movement. The amplitude of the relative horizontal movement between the plates depends on the strength or the weight of the material to be felted.

The known felting machines of the plates type, as referred to, all include the drawback that they cannot be operated continuously, as required, for example, when long webs of felt are to be manufactured. Accordingly, in such a situation, the felting process has to be interrupted at certain intervals and to be performed in individual, subsequent steps, so that only a section corresponding to the length of the plates can be treated at a time. As soon as one section is finished, it is moved onward for the length of a plate so that a similar, subsequent new section can be treated. The result is felt material that has narrow, non-felted strips between adjacent sections.

In machines of the roller type the rollers are arranged, for instance, in two rows, the one row extending above the other and the material to be treated being fed between these two rows so that the fibers are matted together as desired, under the influence of the rolling movement and appropriate pressure. In addition to their rotational movement, the rollers simultaneously perform axial reciprocal movements or oscillations in order to improve the mutual engagement of the fibers. The efficiency of such machines of the roller type is comparatively low. The means heretofore used axially to move the rollers were not capable of driving the rollers at a sufficiently high speed and also were of an extremely short life. Furthermore, the known reciprocating means did not allow changing the characteristics of the axial reciprocation neither with respect to amplitude or stroke nor with respect to frequency. In order to vary the axial movement it was necessary to bring the machine to a complete stop so that the efficiency of these machines was evidently limited to a low rate.

It is therefore an object of this invention to provide an arrangement for a felting machine or the roller type that permits axially to reciprocate the individual rollers at a high, economical speed.

It is another object of this invention to provide an arrangement to move the rollers of a felting machine axially that is subject to little wear-out and, hence, has a long life.

It is a further object of this invention to provide an arrangement for axially reciprocating the individual rollers of a felting machine, that permits variation of this reciprocal movement continuously at will without interrupting the manufacturing process.

Furthermore, it is an object of this invention to provide an arrangement for axially reciprocating the rollers of a felting machine that allows variation at will, either of the stroke or of the frequency of the reciprocal movement, or of both characteristics simultaneously without discontinuing the rotational movement of the rollers or the manufacturing process.

It is an additional object to provide an arrangement axially to reciprocate the rollers in a felting machine that includes means through which the axial movement of the rollers can be controlled easily and rapidly.

Further objects and advantages of the invention will become apparent in connection with the following description of preferred embodiments of this invention, reference being had to the accompanying drawings in which:

FIG. 2 shows another embodiment of this invention including two control units to regulate the axial roller movement and a crankshaft for operating the control units.

Figure 1:
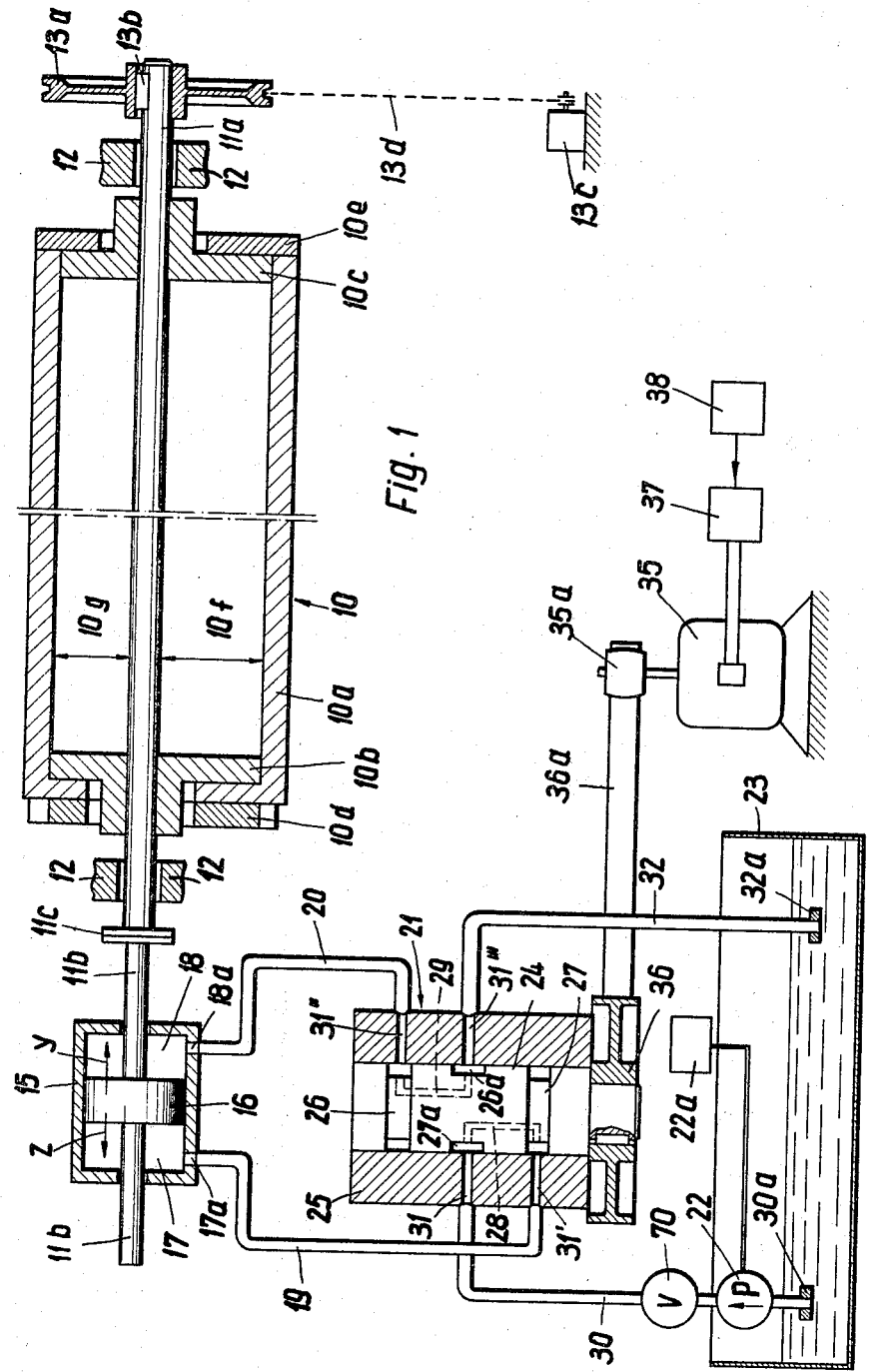
FIG. 1 shows a fragmentary longitudinal cross-section through a roller of a felting machine, through driving means axially to reciprocate the roller, and through a device to control the driving means.

Referring now in detail to the drawings, in FIG. 1 reference numeral 10 designates a roller as used in a felting apparatus of the type herein described and representative of the plurality of rollers used therein. In the actual felting machine, there will preferably be an upper and a lower row, each formed of such rollers 10, the fiber material being passed through the working gap between the two substantially parallel rows. In a practical situation, one row could consist of an odd number of rollers, for instance, 7 rollers, whereas the second row would correspondingly comprise an even number of rollers, for example, 6 or 8 rollers. To achieve a high degree of efficiency, the rollers of one row can be displaced in longitudinal direction of the rows relative to rollers of the other row so that all rollers of one row are arranged in the middle between two adjacent rollers of the opposite row, rollers of one row actually meshing with rollers of the other row.

The individual rollers are supported at small distances from each other in a machine frame, which is not shown but indicated only by fragmentary illustrations of bearings 12. All rollers are normally driven by one common mechanism, but each roller can be driven individually as well.

Roller 10 principally consists of a cylindrical drum-like or sleeve-like member 10a. Drum member 10a is fixedly mounted on a shaft 11a by means of disks 10b and 10c. Plates 10d and 10e close the assembly at both ends. Portions of shaft 11a protruding beyond drum member 10a are supported by bearings 12 at opposite sides of roller 10. A pulley 13a is positively fastened to one end of shaft 11a by means of a wedge 13b. A stationary electric motor 13c or another appropriate driving means is capable of rotating shaft 11a through a belt 13d. Dashed lines extending transversely to the longitudinal axis of shaft 11a indicate that roller 10 is actually longer in comparison with its diameter than represented by the drawing.

According to a preferred embodiment of this invention the cylindrical drum member 10a is not mounted coaxially with shaft 11a but in an eccentric manner to establish different length radii of rotation, 10g and 10f, about shaft 11a. In this manner vertical oscillations of the roller surface are obtained when roller 10 rotates with shaft 11a.

At its left end, shaft 11a is connected with a second shaft portion 11b through a coupling 11c. Shaft portion 11b extends through a stationary housing 15 and mounts a double-acting piston 16. The outer peripheral surface of piston 16 sealingly engages the axial wall portion of housing 15 thereby dividing it into a first and a second chamber 17 and 18. Through port-holes 17a and 18a an appropriate fluid may alternatively be fed into chambers 17 and 18 forcing fluid through port-holes 18a or 17a out of chamber 18 or 17, respectively, when piston 16 is moved in direction of arrow Y or Z. Consequently, in accordance with the rhythm of the flow reversal, piston 16 performs a reciprocal movement due to which the desired reciprocal axial movement of roller 10 is accomplished.

A container 23 is provided for retaining a fluid 23a for the operation of piston 16. A supply conduit 30 having the intake 30a communicates with the interior of container 23 and can be connected through a control unit, to be described later on, selectively to one of two conduits 19, 20, which, in turn, connect with chambers 17, 18 respectively. A back flow conduit 32 having the outlet 32a likewise communicates with the interior of container 23 and through the before-mentioned control unit with either chamber 17 or 18, by means of conduits 19, 20, respectively. The control unit is so designed that, in one position thereof, supply conduit 30 communicates exclusively with chamber 17 whereas back flow conduit 32 connects exclusively with chamber 18, or vice versa. A pump 22 is interconnected into supply conduit 30 to force fluid 23a from container 23 through conduit 30 into either chamber 17 or 18 depending on the position of the control unit, and correspondingly to move roller 10 in direction of arrow Y or Z, respectively. Pressure fluid 23a can be gaslike or a liquid such as oil, and the affected elements as container 23, conduit, housing-piston assembly, control unit, will be designed accordingly, depending on the type of fluid actually used. Instead of pump 22 a blower would be used for pressurizing and delivering a gaslike fluid.

The control unit, generally designated as 21, comprises a cylindrical housing 25 wherein a control cylinder 24 is sealingly and rotatably mounted. An annular groove 26 extends along the periphery of cylinder 24 in the upper portion thereof. A similar annular groove 27 is provided in the lower portion of cylinder 24. A passage 31' communicates between the interior and the exterior of housing 25 at a level thereof at which this passage always communicates with groove 27 regardless of the annular position of cylinder 24 with respect to housing 25. In the same way passage 31" communicates with groove 26 and the exterior of housing 25. In addition, housing 25 has an inlet port 31 and an outlet port 31''' both located at the same axial height of housing 25, but spaced apart from each other with respect to the circumference thereof. Cylinder 24 is provided with corresponding recesses 26a and 27a at the same level as ports 31 and 31'''. Recesses 26a, 27a extend only over a limited arcuate length of the cylinder periphery so that in one position of cylinder 24 recess 27a can communicate with inlet port 31 whereas recess 26a communicates with outlet port 31''', and that in another, second position of cylinder 24 recess 27a communicates with outlet port 31''' and recess 26a with inlet port 31. Recesses 26a 27a are furthermore connected permanently, regardless of the cylinder position, with annular grooves 26, 27 through peripheral channels 28, 29, respectively.

In the first position of cylinder 24 relative to housing 25, as shown in FIG. 1, fluid may be forced by pump 22 through conduit 30, inlet port 31, channel 28, annular groove 27, thence through conduit 19 into chamber 17 pushing piston 16 in direction of arrow Y. Simultaneously, fluid present in second chamber 18, when piston 16 is moved in direction Y, will escape through port-hole 18a and conduit 20, passage 31", annular groove 26, channel 29, returning through recess 26a, outlet port 31''' and conduit 32 into container 23.

As explained above, when cylinder 24 is turned into its second position, recess 26a communicates with inlet port 31 whereas recess 27a is in communication with outlet port 31'''. Consequently, fluid forced into conduit 30 by pump 22 enters now channel 29, groove 26, passage 31" and conduit 20, reaching second chamber 18, so that piston 16 is moved this time in direction Z. Fluid from chamber 17 then returns to container 23 through conduit 19, passage 31', groove 27, channel 28, and outlet port 31'''. It is apparent that by turning control cylinder 24 from its first into its second position the direction of fluid flow can be returned at will, roller 10 thereby being reciprocated.

At its bottom, cylinder 24 is coupled with a wheel 36 that can be turned by an electrical motor 35 or a similar driving means through a belt 36a partly extending around wheel 36, and a pulley 35a connected with motor 35. Block 37 represents a source of energy to feed motor 35, whereas block 38 is illustrative of an arrangement to control the energy source 37 according to a predetermined program as stored, for example, in punched cards, a magnetic tape or the like. Changing the speed of the motor 35 and consequently the rotations per time unit of cylinder 24, likewise changes the frequency at which the direction of fluid flow through conduits 19 and 20 is reversed. This, in turn, varies the frequency of the axial reciprocation of roller 10. Increasing the motor speed increases the frequency of reciprocation of roller 10, whereas lowering the speed of motor 35 has the opposite effect on roller 10. Evidently this frequency control can easily occur at any desired rate while roller 10 is spinning about its longitudinal axis, with no interruption of the production process being required.

The new arrangement according to this invention likewise makes it possible to control the stroke or amplitude of the axial reciprocal movement of roller 10. This is easily accomplished by changing the speed at which pump 22 operates so that a lower or a higher amount of fluid is forced, per time unit, through conduit 30. Block 22a is representative of a resistor unit or a similar arrangement capable of changing the pump speed as desired. In case pump 22 is of a constant delivery type a suitable throttle valve 70 is provided to control the amount of fluid actually passing through conduit 30.

A second preferred embodiment of this invention is illustrated in FIG. 2. The control arrangement of this embodiment includes a first and a second control valve generally designated 40 and 41. All parts substantially identical to parts of FIG. 1, as the roller, piston, housing, container, etc., bear identical reference numerals in this second embodiment.

Control valve 40 and 41 each comprise a housing 42 or 43 into which a control plunger 44 or 45, respectively, is inserted. The plungers may, for example, be of cylindrical cross-section and are reciprocally guided in their respective housings. Springs 52 and 53 are sandwiched between the lower end faces of plungers 44, 45 and the respective bottoms of housings 42, 43, normally urging plungers 44, 45 into their upper position. Plungers 44, 45 are prevented from leaving housings 42, 43 by means of annular disks 42a and 43a secured on top of the housing. Disks 42a and 43a each have a central bore through which reduced diameter portions 44a and 45a of plungers 44 and 45 penetrate with sufficient clearance. The diameter of the central bores, however, is small enough so that the upper surfaces of plungers 44 and 45 abut thereagainst when reaching their upper end positions.

Housing 42 is provided with radial passages 55 and 55''' communicating between the interior and the exterior of housing 42, and furthermore, with an inlet port 55' and an outlet port 55'' both ports being similar to passages 55 and 55'''. Annular grooves 46, 46', 46'' and 46''' extend along the periphery of plunger 44 at the same levels as passages and ports 55, 55', 55'' and 55''' when plunger 44 is in its lower position.

In the same manner housing 43 is provided with radial passages 56 and 56''', an inlet port 56' and an outlet port 56''. Grooves 47, 47', 47'', 47''' surround plunger 45 at its periphery and are at the levels of passages and ports 56, 56', 56'' and 56''', when plunger 45 is brought into its lower position.

Grooves 46 and 46' of plunger 44 communicate with each other through a channel 48 as indicated in dotted lines and grooves 46'' and 46''' are connected through a channel 49. Similarly, a channel 50 connects grooves 47 and 47' with each other whereas grooves 47'' and 47''' are inter-connected by a channel 51.

Pump 22 is here connected to container 23 through an intake 60a and is associated with inlet ports 55' and 56' through supply conduit 60 branching into arms 61 and 67. Outlet ports 55'' and 56'' are connected through arms 65 and 68, respectively, to back-flow conduit 65 terminating into an outlet 65a in the interior of container 23.

Chamber 17 of housing 15 connects through its port hole 17a with a conduit section 64 that divides into branches 64a and 66 associated in turn with passages 55''' and 56, respectively. Chamber 18 communicates through port hole 18a and conduit portion 63 with passage 55 by means of conduit branch 62, and with passage 56''' by means of conduit branch 69.

When plunger 44 is in its lower active position and plunger 45 is in its inactive position as shown in FIG. 2, fluid urged by pump 22 travels from container 23 through conduit 60, branch 61, passage 55', annular groove 46', channel 48, groove 46, passage 55 and through branches 62, 63 via port hole 18a into chamber 18. As a result pressure is applied to piston 16 and roller 10 is moved in direction of arrow $Z_1$. Simultaneously, any fluid accumulated in chamber 17 will leave through conduit sections 64, 64a, passage 55''', groove 46'', channel 49, groove 46''', reaching outlet port 55'' and returning through sections 65b, 65 into container 23.

To move roller 10 subsequently in direction of arrow $Y_1$, plunger 44 is shifted from its lower active position into its upper inactive position in which all of the passages provided in housing 42 are blocked at their inner ends, while plunger 45 is pressed downwardly from its upper, inactive position into its lower, active position in which passage 56 communicates with inlet 56' and outlet port 56'' communicates with passage 56'''. Consequently, the flow of the fluid in conduit sections 63 and 64 is reversed in its direction and the fluid now travels from conduit 60 through branch 67, inlet port 56', channel 50 and passage 56 through section 66 and 64 into chamber 17. Fuid escaping chamber 18 when piston 16 moves in direction of arrow Y, due to pressure exerted by fluid entering chamber 17 returns to container 23 through sections 63 and 69, passage 56''', channel 51, outlet port 56'', section 68 and through back flow conduit 65.

A control shaft 54 with eccentric sections 54b and 54c is supported by a plurality of bearings 12a by means of which shaft 54 control plungers 44, 45 can readily be actuated, the eccentric sections 54b and 54c cooperating with the portions 44a and 45a of plungers 44 and 45, respectively. An electromotor 54d is provided to rotate control shaft 54 by means of a pulley 54a mounted at the adjacent end of shaft 54, and through a belt 54e. With motor 54d running, shaft 54 is turned and, as evident from the drawing, plungers 44 and 45 are reciprocated in their respective housings under the opposite influences of the eccentric sections 54b and 54c on the one hand, and springs 52 and 53 on the other hand. The eccentric sections 54b and 54c are displaced relative to each other at an angle of substantially 180°, so that definitely plunger 44 is in its lower active positive position only when plunger 45 is in its upper, inactive position, and vice versa. The eccentric portions 54b and 54c can be eccentric sections as provided in a crank shaft or cams mounted on a normal, straight shaft.

Each shaft 11a of a roller 10 is provided with its own corresponding driving structure as housing 15 and piston 16. The driving structures of either all rollers or a portion thereof can be associated with one common control unit 21 or 40, 41, respectively. For example, the driving structures of all rollers of the upper row could be associated with one common control unit and all rollers of the lower row with another common control unit, a single common pump, however, supplying the pressurized fluid to the driving structures of the rollers of the upper row as well as of the lower row through the respective control units. The driving means for the pump 22 and for actuation of the control units may be the same motor.

It will be understood that several changes of the described embodiments can be made, for example, combining the two control valves 40, 41 in one single structure, without departing from the scope of the invention.

What is claimed is:

1. In an apparatus for converting fiber-like material into felt including rollers for the treatment of said fiber-like material, first driving means to rotate said rollers, and shafts mounting said rollers: second driving means for axially reciprocating said rollers comprising a housing, stationary with respect to said rollers, a piston rigidly coupled to one of said shafts and reciprocal in said housing, said piston defining at its opposite sides a first and a second pressure tight chamber in said housing, a reservoir containing a fluid for the transmission of pressure, conduit means having an intake and an outlet communicating with said first and said second chamber and through said intake and outlet with said reservoir, supply means for feeding said fluid through said intake from said reservoir to said chambers and from said chambers through said outlet back to said reservoir, and control means selectively to feed said fluid through said intake from said reservoir alternatively to one of said chambers and from the other of said chambers back through said outlet to said reservoir.

2. An arrangement as set forth in claim 1, wherein said conduit means has pressure regulating means to control the pressure of the fluid fed to one of said chambers.

3. An arrangement as set forth in claim 1 wherein said control means comprises a second housing having a cylindrical bore, an inlet port and an outlet port and a first and a second passage, a cylindrical body having at least a first and a second group of peripheral passageways rotatably mounted in said bore, and sealingly received therein, said first and said second passage communicating through a first and a second conduit with said first and said second chamber, respectively, and said inlet and said outlet port communicating through a third and a fourth conduit with said reservoir, respectively, in a first position of said cylindrical body relative to said second housing said first passage communicating through said first group of peripheral passageways with said inlet port and said second passage communicating through said second group of peripheral passageways with said outlet port, and in a second position of said cylindrical body relative to said second housing said first passageway communicating through said first group of passageways with said outlet port and said second passageway communicating through said second group of passageways with said inlet port, and third driving means to rotate said cylindrical body.

4. The arrangement of claim 3, wherein said third driving means has means to regulate the speed at which said third driving means rotates said cylindrical body.

5. The arrangement of claim 4, wherein said regulating means includes program means.

6. The arrangement as set forth in claim 3, wherein rollers are formed as hollow cylindrical drums and wherein said drums are mounted eccentrically on said shafts.

7. The arrangement as set forth in claim 1, wherein said control means comprises a first control housing and a second control housing each control housing having passages extending through the walls thereof, a first and a second control plunger each having peripheral grooves sealingly received and longitudinally movable in said first and said second housing, respectively, and third driving means selectively to shift one of said plungers with respect to its housing into its first, active position and simultaneously to shift the other of said plungers into its second inactive position, and vice versa, said first plunger in its first position connecting through its peripheral grooves and said passages of said first housing and said conduit means said intake with said second chamber and said outlet with said first chamber and in its second position blocking said passages of said first control housing, and said second plunger in its first, active position connecting through its peripheral grooves, said passages of said second control housing, and said conduit means said intake with said first chamber and said outlet with said second chamber, and in its second position blocking said passages of said second control housing.

8. The arrangement as set forth in claim 7 wherein said third driving means comprises a control shaft having a first and a second eccentric section each displaced about 180° relative to each other, said first section cooperating with one end of said first plunger to shift it from its second inactive position into its first, active position and said second section cooperating with one end of said second plunger to shift it from its second, inactive position into its first, active position, spring means urging said plungers into their respective second, inactive position, and means to rotate said control shaft.

9. The arrangement of claim 8, wherein said supply means has means for regulating the delivery output of said supply means.

10. The arrangement of claim 8, wherein said conduit means has pressure regulating means for controlling the pressure of the fluid fed to one of said chambers.

11. The arrangement of claim 10, wherein said pressure regulating means is a throttle valve.

12. The arrangement as set forth in claim 1, wherein said rollers are formed as hollow cylindrical drums and wherein said drums are mounted eccentrically on said shafts.

13. An arrangement as set forth in claim 1, wherein said supply means has means for regulating the delivery output of said supply means.

References Cited

UNITED STATES PATENTS

| | | | |
|---|---|---|---|
| 1,984,701 | 12/1934 | Reynolds | 28—5 |
| 2,448,441 | 8/1948 | Kingston | 28—14 |
| 3,032,854 | 5/1962 | Bruyere | 28—5 |

MERVIN STEIN, *Primary Examiner.*

L. K. RIMRODT, *Assistant Examiner.*